United States Patent
Nishigaki et al.

(10) Patent No.: US 12,479,314 B2
(45) Date of Patent: Nov. 25, 2025

(54) VEHICLE

(71) Applicant: TOYOTA JIDOSHA KABUSHIKI KAISHA, Toyota (JP)

(72) Inventors: Nobuhide Nishigaki, Toyota (JP); Kazumasa Shimode, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 489 days.

(21) Appl. No.: 18/113,315

(22) Filed: Feb. 23, 2023

(65) Prior Publication Data

US 2023/0271507 A1 Aug. 31, 2023

(30) Foreign Application Priority Data

Feb. 25, 2022 (JP) ................. 2022-028440

(51) Int. Cl.
*B60L 15/20* (2006.01)
*B60K 1/02* (2006.01)
(Continued)

(52) U.S. Cl.
CPC ........... *B60L 15/2036* (2013.01); *B60K 1/02* (2013.01); *B60L 50/00* (2019.02); *H02P 5/50* (2013.01)

(58) Field of Classification Search
CPC .......... B60L 15/2036; B60L 2240/423; B60L 50/10; B60L 50/00; B60L 50/60;
(Continued)

(56) References Cited

U.S. PATENT DOCUMENTS 9,186,989 B2 * 11/2015 Hashimoto ............... B60K 6/52
2017/0113569 A1 * 4/2017 Lai ............................ H02P 6/04
(Continued)

FOREIGN PATENT DOCUMENTS

CN 106965658 A 7/2017
CN 114954031 A * 8/2022 .............. B60L 15/38
(Continued)

OTHER PUBLICATIONS

Fan, Four-Wheel Drive Electric Vehicle Power Distribution Method and Apparatus, Feb. 24, 2022, EPO, WO 2022037651 A1, Machine Translation of Description (Year: 2022).*

*Primary Examiner* — Paul N Dickson
*Assistant Examiner* — Matthew D Lee
(74) *Attorney, Agent, or Firm* — Dinsmore & Shohl LLP

(57) ABSTRACT

A vehicle includes: a plurality of wheels; a plurality of rotary electric machines, each configured to generate a driving force or a braking force for one of the plurality of wheels independently from other rotary electric machines; a power storage device configured to exchange electric power with the plurality of rotating electric machines; a processor configured to calculate a required torque of each of the plurality of wheels; a rotational speed detecting sensor configured to detect a rotational speed of each of the plurality of wheels; and a controller configured to calculate a power distribution ratio that is a distribution ratio of electrical power from the power storage device to the plurality of rotating electric machines based on the required torque of each of the plurality of wheels and the rotational speed of each of the plurality of wheels.

3 Claims, 5 Drawing Sheets

(51) Int. Cl.
*B60L 50/00* (2019.01)
*H02P 5/50* (2016.01)

(58) Field of Classification Search
CPC ......... B60L 2240/461; B60L 2240/463; B60L 15/20; B60K 1/02; H02P 5/50; B62D 61/12; B62D 61/125
See application file for complete search history.

(56) References Cited

U.S. PATENT DOCUMENTS

| | | | |
|---|---|---|---|
| 2017/0113572 A1* | 4/2017 | Lai | B60L 50/60 |
| 2021/0237584 A1* | 8/2021 | Tabata | B60L 7/26 |
| 2023/0027431 A1* | 1/2023 | Kaneko | B60W 30/045 |
| 2023/0271507 A1* | 8/2023 | Nishigaki | B60L 50/00 |
| | | | 180/6.5 |

FOREIGN PATENT DOCUMENTS

| | | | | |
|---|---|---|---|---|
| CN | 117360266 A * | 1/2024 | | B60L 15/20 |
| DE | 102024100141 A1 * | 7/2024 | | H02P 5/46 |
| JP | 2006-213130 A | 8/2006 | | |
| JP | 2007014185 A * | 1/2007 | | H02P 21/16 |
| JP | 2010-095089 A | 4/2010 | | |
| JP | 2015-053782 A | 3/2015 | | |
| WO | WO-2022037651 A1 * | 2/2022 | | B60W 30/18 |

* cited by examiner

FIG.1
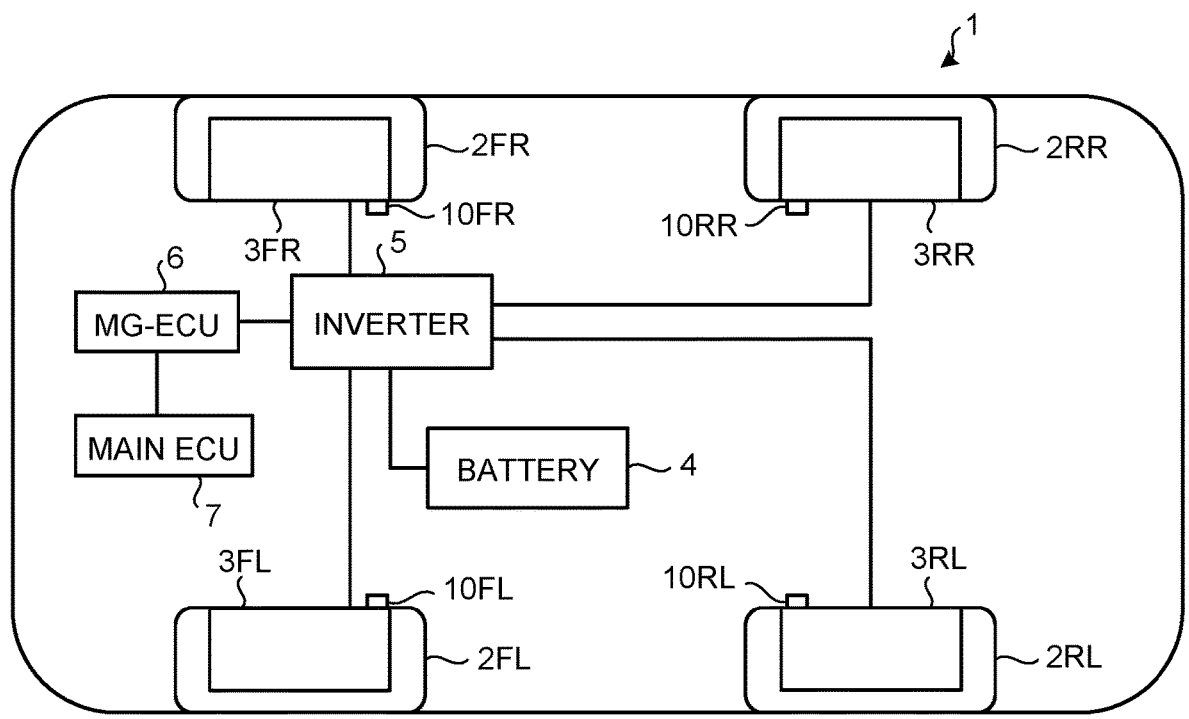
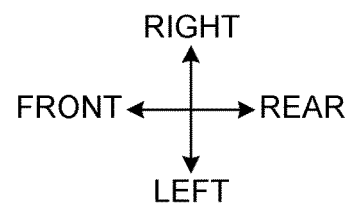

FIG.2
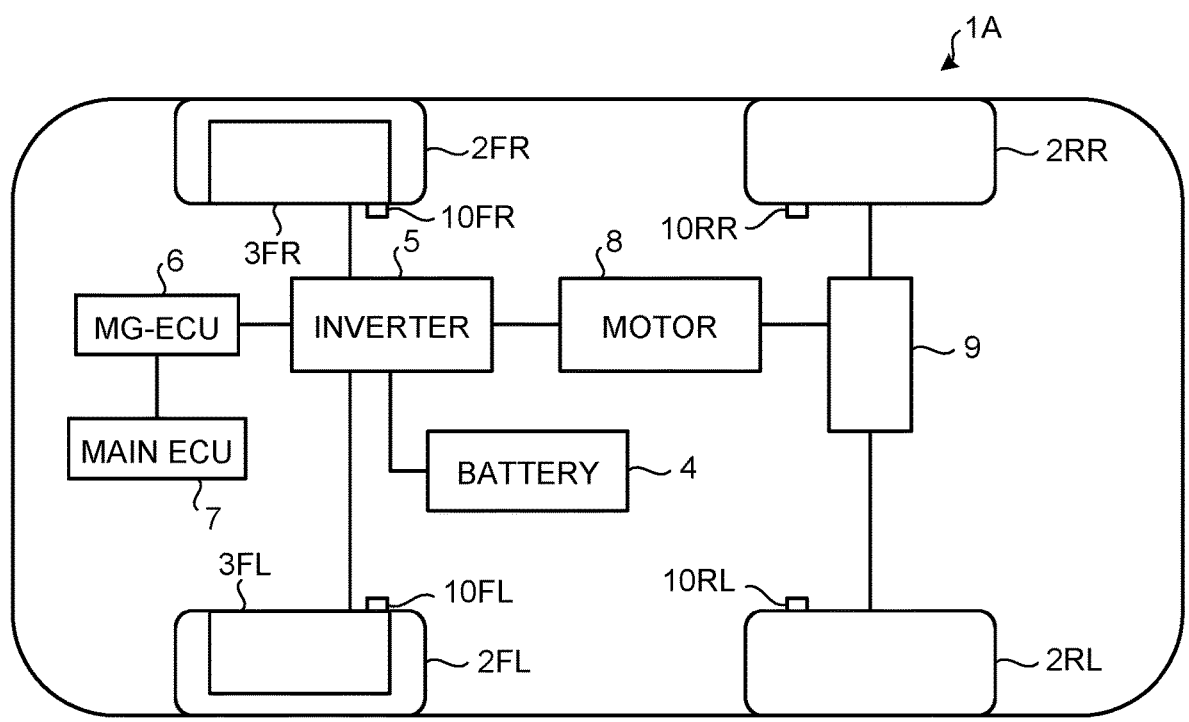
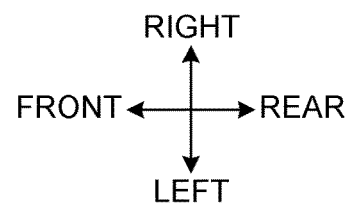

VEHICLE

CROSS-REFERENCE TO RELATED APPLICATIONS

The present application claims priority to and incorporates by reference the entire contents of Japanese Patent Application No. 2022-028440 filed in Japan on Feb. 25, 2022.

BACKGROUND

The present disclosure relates to a vehicle.

JP 2015-053782 discloses a technique for calculating, by a control device, a power distribution ratio that is a ratio of power from a battery distributed between a drive motor of front wheels and a drive motor of rear wheels in a vehicle in which the drive motor is mounted in correspondence to each of the front and rear wheels.

SUMMARY

When driving each wheel of the front and rear wheels by an in-wheel motor or the like, the rotational speed of the left and right wheels in each of the front and rear wheels is not necessarily the same. However, the technique disclosed in Patent Document 1 does not take the rotational speed of each wheel into consideration for calculating the power distribution ratio.

There is a need for a vehicle capable of calculating the power distribution ratio of each wheel appropriately even in a traveling state such that the rotational speed of each wheel is different.

According to one aspect of the present disclosure, there is provided a vehicle including: a plurality of wheels; a plurality of rotary electric machines, each configured to generate a driving force or a braking force for one of the plurality of wheels independently from other rotary electric machines; a power storage device configured to exchange electric power with the plurality of rotating electric machines; a processor configured to calculate a required torque of each of the plurality of wheels; a rotational speed detecting sensor configured to detect a rotational speed of each of the plurality of wheels; and a controller configured to calculate a power distribution ratio that is a distribution ratio of electrical power from the power storage device to the plurality of rotating electric machines based on the required torque of each of the plurality of wheels and the rotational speed of each of the plurality of wheels.

BRIEF DESCRIPTION OF THE DRAWINGS

FIG. 1 is a diagram illustrating a schematic configuration of a vehicle according to an embodiment;

FIG. 2 is a diagram illustrating another schematic configuration of a vehicle according to the embodiment;

DETAILED DESCRIPTION

Figure 3:
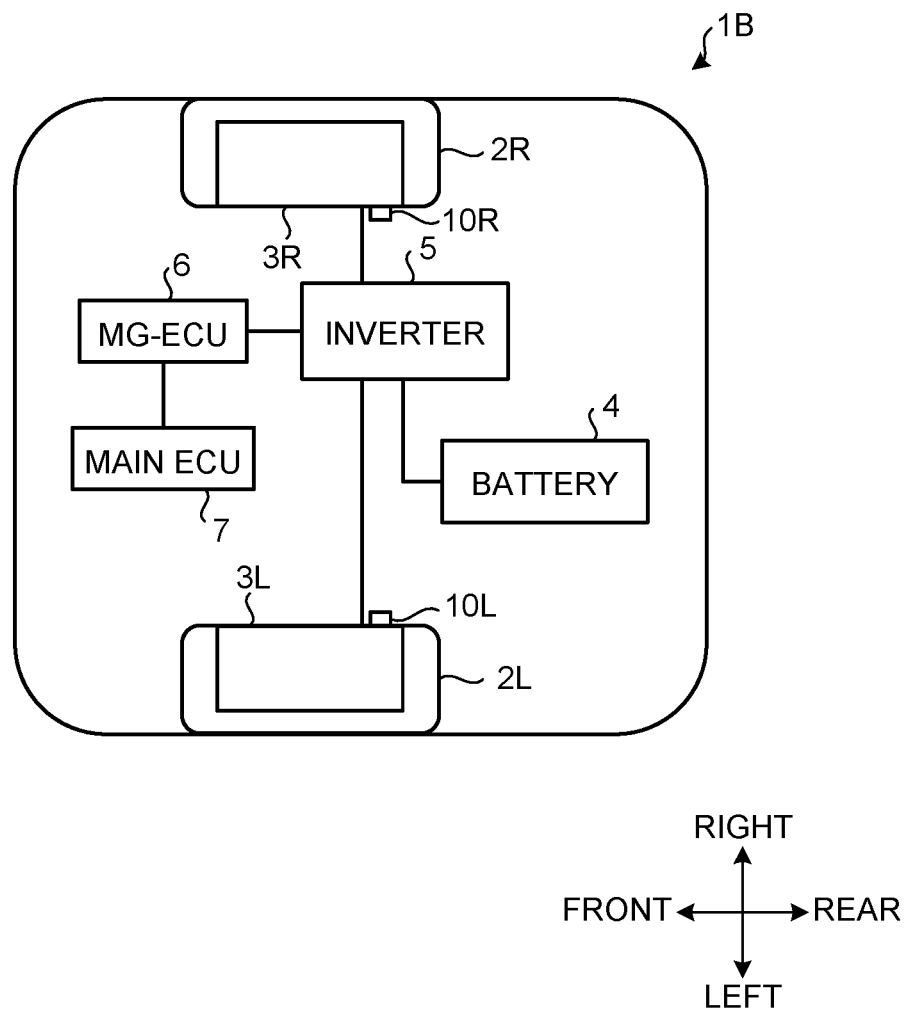
FIG. 3 is a diagram illustrating still another schematic configuration of a vehicle according to the embodiment.

An embodiment of a vehicle according to the present disclosure will be described below. Note that the present disclosure is not limited by the present embodiment.

FIG. 1 is a diagram illustrating a schematic configuration of a vehicle 1 according to the embodiment. Vehicle 1 according to the embodiment includes an in-wheel motor capable of individually controlling the torque applied to a plurality of drive wheels, respectively. FIG. 1 illustrates a configuration example of a vehicle in-wheel motor provided to impart torque individually to each of the front, rear, left and right wheels.

The vehicle 1 according to the embodiment includes: left and right front wheels 2FR and 2FL; left and right rear wheels 2RR and 2RL; in-wheel motors 3FR and 3FL that are rotating electric machines provided on the left and right front wheels 2FR and 2FL; in-wheel motors 3RR and 3RL provided on the left and right rear wheel 2RR and 3RL; a battery 4 that is a power storage device; an inverter 5; an MG-electronic control unit (MG-ECU) 6; a main ECU 7; and wheel rotational speed sensors 10FR, 10FL, 10RR, 10RL and the like.

Each of the plurality of wheels 2FR, 2FL, 2RR and 2RL is suspended in the vehicle body of the vehicle 1 via independent suspension mechanisms. Incidentally, in the following description, when not particularly distinguishing wheels 2FR, 2FL, 2RR and 2RL, they are simply referred to as wheel 2. The in-wheel motors 3FR, 3FL, 3RR and 3RL that are a plurality of rotary electric machines are respectively provided inside the wheel of the wheels 2FR, 2FL, 2RR and 2RL. Incidentally, in the following description, when not particularly distinguishing the in-wheel motors 3FR, 3FL, 3RR and 3RL, they are simply referred to as the in-wheel motor 3FR. The in-wheel motors 3FR, 3FL, 3RR and 3RL generate a driving force or a braking force (regenerative braking force) independently for the plurality of wheels 2FR, 2FL, 2RR and 2RL by independently controlling the rotation by the MG-ECU 6 individually and independently.

These in-wheel motors 3FR, 3FL, 3RR and 3RL are constituted by, for example, AC synchronous motors, and connected to the battery 4 via the inverter 5. Therefore, when driving the in-wheel motors 3FR, 3FL, 3RR and 3RL, the DC power of the battery 4 is converted into AC power by the inverter 5, the AC power is supplied to the in-wheel motors 3FR, 3FL, 3RR and 3RL, and thereby the in-wheel motors 3FR, 3FL, 3RR and 3RL are power controlled, and the driving torque is supplied to the wheels 2FR, 2FL, 2RR and 2RL.

Moreover, the in-wheel motors 3FR, 3FL, 3RR and 3RL may be regeneratively controlled by utilizing the rotational energy of the wheels 2FR, 2FL, 2RR and 2RL. That is, at the time of regenerative power generation of the in-wheel motors 3FR, 3FL, 3RR and 3RL, the rotational energy of the wheels 2FR, 2FL, 2RR and 2RL is converted into electric energy by the in-wheel motors 3FR, 3FL, 3RR and 3RL, power generated at that time is stored in the battery 4 via the inverter 5. At this time, the wheels 2FR, 2FL, 2RR and 2RL are given a braking torque based on the regenerative power generation.

The inverter 5 is connected to the MG-ECU 6 for controlling the rotational status of the in-wheel motors 3FR, 3FL, 3RR and 3RL. The MG-ECU 6 is a well-known microcomputer-based electronic circuit physically including a CPU (central processing unit), a RAM (random access memory), a ROM (read only memory), interfaces, and the like. The MG-ECU 6 performs an operation using data input to the RAM, data stored in the ROM or the like, and outputs the operation result as a command signal.

This MG-ECU 6, for example, is configured to receive signals such as detection signals from various types of sensors and information signals from the inverter 5. The detection signals are, for example, input from: the wheel rotational speed sensors 10FR, 10FL, 10RR and 10RL that are rotational speed detecting sensors for detecting the rotational speed of the wheels 2; and a rotation angle sensor for detecting the rotational angle of the output shaft of the in-wheel motors 3FR, 3FL, 3RR and 3RL. Based on the signals input from the inverter 5 to MG-ECU 6, the output torques of the in-wheel motors 3FR, 3FL, 3RR and 3RL (motor torque) are calculated by the MG-ECU 6, respectively. For example, when detecting, by the input signals from the inverter 5, that the in-wheel motors 3FR, 3FL, 3RR and 3RL is power running control, an amount of power or a current value supplied to the in-wheel motors 3FR, 3FL, 3RR and 3RL at that time is detected, the motor torque of the in-wheel motors 3FR, 3FL, 3RR and 3RL may be calculated based on the detected amount of power or the detected current value. Further, based on the current value when controlling the rotation of the in-wheel motors 3FR, 3FL, 3RR and 3RL, it is also possible to calculate the rotational speed of the in-wheel motors 3FR, 3FL, 3RR and 3RL, respectively.

On the other hand, the MG-ECU 6 is configured to output a signal for controlling the rotation of the in-wheel motors 3FR, 3FL, 3RR and 3RL via the inverter 5. That is, the MG-ECU 6 is configured to output, to the inverter 5, a control signal for controlling the current supplied to the in-wheel motors 3FR, 3FL, 3RR and 3RL in order to control the rotation of the in-wheel motors 3FR, 3FL, 3RR and 3RL (power running and regeneration), or for controlling the current recovered from the in-wheel motors 3FR, 3FL, 3RR and 3RL. The MG-ECU 6 is also connected to the main ECU 7.

The main ECU 7 is a higher-level electronic control device for controlling other ECUs, and is configured to monitor and control various electronic control devices such as an electronic control device for controlling the MG-ECU 6 and the battery 4. The main ECU 7 is a well-known microcomputer-based electronic circuit physically including a CPU (central processing unit), a RAM (random access memory), a ROM (read only memory), interfaces, and the like. The main ECU 7 performs an operation using data input to the RAM and data stored in the ROM or the like, and outputs the operation result as a command signal.

The main ECU 7, for example, is configured to receive, directly or via the other electronic control device (ECU), signals such as detection signals from various types of sensors and information signals from the inverter 5. The detection signals are, for example, input from: the wheel rotational speed sensors 10FR, 10FL, 10RR and 10RL for detecting the rotational speed (wheel speed) of the wheels 2; and a rotation angle sensor for detecting the rotational angle of the output shaft of the in-wheel motors 3FR, 3FL, 3RR and 3RL.

Moreover, each wheel 2 includes a brake mechanism. Each braking mechanism is a known braking device, such as, for example, a disc brake or a drum brake, in which various braking devices are appropriately selected and installed.

Although FIG. 1 illustrates the configuration example of the vehicle 1 of the four-wheel drive system in which the in-wheel motors 3FR, 3FL, 3RR and 3RL are provided to the left and right front wheels 2FR and 2FL and the left and right rear wheels 2RR and 2RL, respectively, it may be a vehicle 1A of the four-wheel drive system in which the in-wheel motors 3FR and 3FL are provided to the left and right front wheels and a drive unit including a motor 8 and a differential device 9 for driving the left and right rear wheels 2RR and 2RL as illustrated in FIG. 2. Moreover, as illustrated in FIG. 3, it may be a vehicle 1B of the two-wheel drive system in which the in-wheel motors 3R and 3L are provided to the left and right wheel 2R and 2L, respectively, and the rotational speed of the left and right wheels 2R and 2L are detected by the wheel rotational speed sensors 10R and 10L. The vehicle according to the present disclosure may have a configuration in which a plurality of drive wheels may be independently and directly driven, for example, by the above-described in-wheel motors 3 that independently and directly drive the left and right drive wheels.

In the vehicle 1 according to the embodiment, the MG-ECU 6 calculates and determines the required torque of the wheels 2 (the front left and right wheels 2FR and 2FL and the rear left and right wheels 2RR and 2RL), for example, based on the required driving force of the vehicle 1 in accordance with the accelerator opening and the vehicle speed, etc. That is, the MG-ECU 6 functions as a torque calculating unit for calculating the required torque of the wheels 2. Then, the MG-ECU 6, from the required torque of each wheel 2 and the rotational speed of each wheel 2, determines the required power of each wheel 2 which is the power required for each in-wheel motor 3 (in-wheel motors 3FR, 3FL, 3RR and 3RL) provided on each wheel 2 from the battery 4, and calculates the power distribution ratio of each wheel 2 which is the distribution ratio of electrical power for each in-wheel motor 3 of each wheel 2 from the battery 4. Thus, according to the vehicle 1 of the embodiment may appropriately calculate the power distribution ratio of each wheel 2 by the MG-ECU 6 even in the running condition such that the rotational speed of each wheel 2 is different. The control of calculating the power distribution ratio of the wheels 2 may be performed by the ECU 7 or in cooperation with the main MG-ECU 6 and the ECU 7 instead of the MG-ECU 6.

Figure 4:
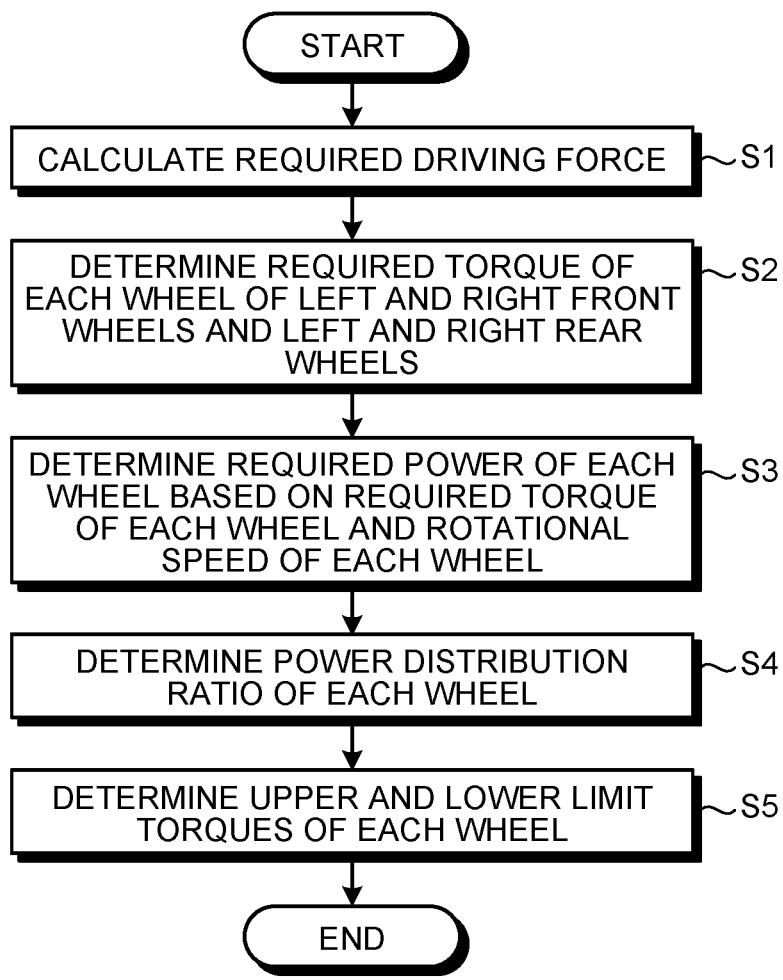
FIG. 4 is a flowchart illustrating an exemplary control implemented by MG-ECU according to the embodiment.
Figure 5:
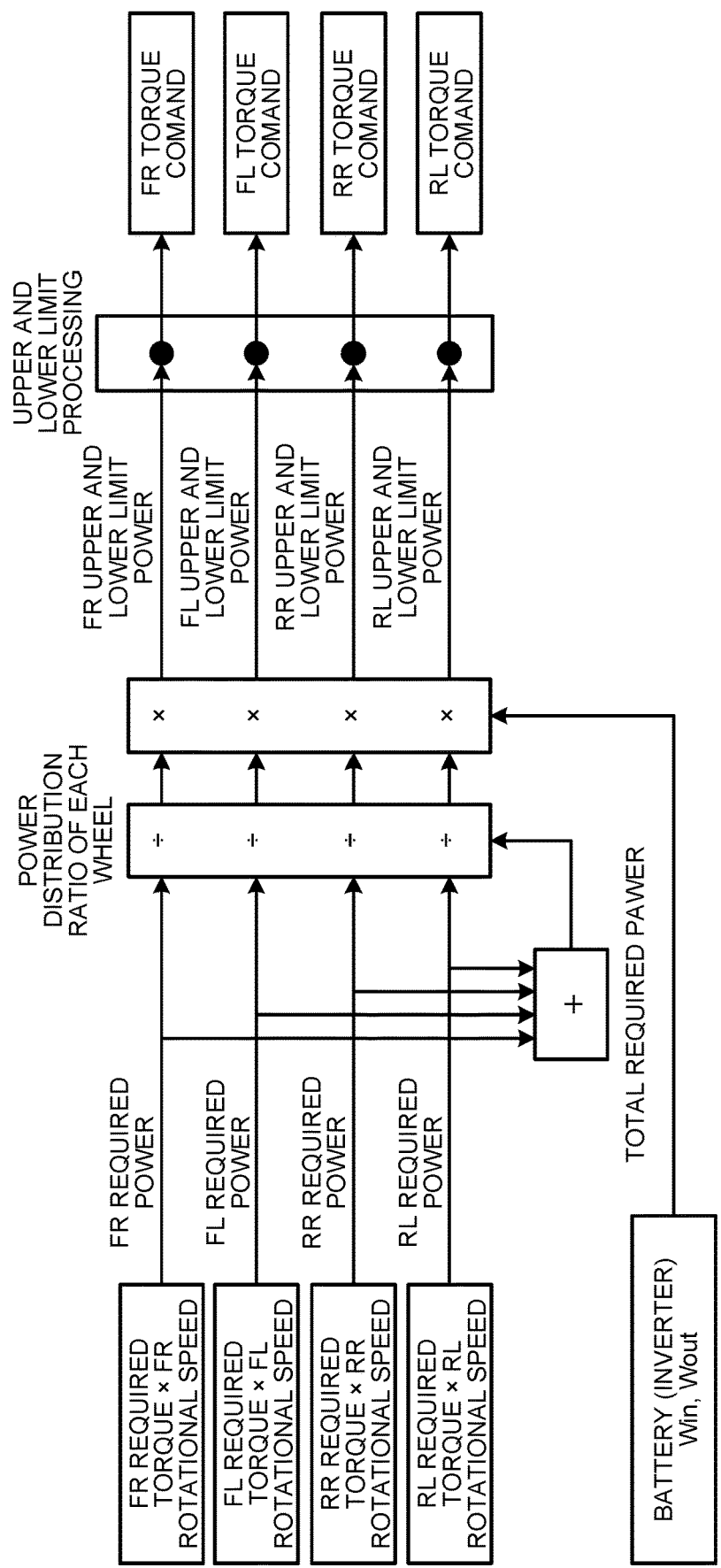
FIG. 5 is a diagram illustrating the steps of control until MG-ECU calculates the power distribution ratio of each wheel and outputs a signal of a torque command for each wheel.

FIG. 4 is a flowchart illustrating an exemplary control implemented by the MG-ECU 6 according to the embodiment. FIG. 5 is a diagram illustrating the steps of the control until the MG-ECU 6 calculates the power distribution ratio of the wheels 2 and outputs a signal of the torque command of the wheels 2.

As illustrated in FIG. 4, first, the MG-ECU 6 calculates the required driving force of the vehicle 1 according to the accelerator opening, the vehicle speed, and the like (Step S1). Next, the MG-ECU 6 determines the required torque of each wheel 2 of the left and right front wheels 2FR and 2FL and the left and right rear wheels 2RR and 2RL based on the required driving force of the vehicle 1 (Step S2). Next, the MG-ECU 6 multiplies the required torque of each wheel 2 and the rotational speed of each wheel 2, as illustrated in FIG. 5, to determine the required power (FR required power, FL required power, RR required power and RL required power) of each wheel 2 that is the power required for each in-wheel motor 3 provided on each wheel 2 from the battery 4 (in-wheel motors 3FR, 3FL, 3RR and 3RL) (Step S3). Next, as illustrated in FIG. 5, the MG-ECU 6 subtracts the required power of each wheel 2 by the total required power to determine the power distribution ratio of each wheel 2, which is the distribution ratio of electrical power to each in-wheel motor 3 of each wheel 2 from the battery 4 (Step S4). Next, the MG-ECU 6, as illustrated in FIG. 5, multiplies the power distribution ratio of each wheel 2 by the amount of power (Win, Wout) that may be input and output by the battery 4 (inverter 5) to determine the upper and lower limit power (FR upper and lower limit power, FL upper and lower limit power, RR upper and lower limit power and RL upper and lower limit power) of each wheel 2 which is the upper and lower limit of the power that may be supplied to each in-wheel motor 3 of each wheel 2 from the battery 4. Next, the MG-ECU 6, as illustrated in FIG. 5, based on the upper and lower limit power of each wheel 2 corrected by performing the upper and lower limit processing, calculates the torque command value of each wheel 2 for controlling each in-wheel motor 3, and outputs a signal of the torque command to the inverter 5 (Step S5).

Thus, the MG-ECU 6 may appropriately control each in-wheel motor 3 and ensure the maximum traveling function of the vehicle 1 even in a state in which the input and output power of the battery 4 is limited due to thermal constraints and power constraints, and in a traveling state such that the rotational speed of each wheel 2 in which each in-wheel motor 3 is provided is different.

According to the present disclosure, it is possible to appropriately control each rotating electric machine to ensure the maximum traveling function of the vehicle.

Further, according to the present disclosure, the plurality of wheels may be left and right front wheels and left and right rear wheels.

According to the present disclosure, in the vehicle of the four-wheel drive system in which a plurality of rotary electric machines are provided in correspondence with the left and right front wheels and left and right rear wheels, it is possible to appropriately calculate the power distribution ratio even when the respective rotational speeds of the left and right front wheels are different.

The vehicle according to the present disclosure is able to calculate the power distribution ratio of each wheel appropriately even in a traveling state such that the rotational speed of each wheel is different.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle comprising:
a plurality of wheels;
a plurality of rotary electric machines, each configured to generate a driving force or a braking force for one of the plurality of wheels independently from other rotary electric machines;
a power storage device configured to exchange electric power with the plurality of rotating electric machines;
a processor configured to calculate a required torque of each of the plurality of wheels;
a rotational speed detecting sensor configured to detect a rotational speed of each of the plurality of wheels; and
a controller configured to:
calculate a power distribution ratio that is a distribution ratio of electrical power from the power storage device to the plurality of rotating electric machines based on the required torque of each of the plurality of wheels and the rotational speed of each of the plurality of wheels, and
control the plurality of rotating electric machines by calculating a torque command value of each of the plurality of wheels based on electric power suppliable to each of the plurality of rotating electric machines from the power storage device, the suppliable electric power being calculated using the power distribution ratio and the inputtable and outputtable power of the power storage device.

2. The vehicle according to claim 1, wherein the plurality of wheels include left and right front wheels and left and right rear wheels.

3. The vehicle according to claim 1, wherein the plurality of wheels include left and right front wheels and left and right rear wheels.

* * * * *